(12) United States Patent
Higuchi et al.

(10) Patent No.: US 7,727,437 B2
(45) Date of Patent: Jun. 1, 2010

(54) GOLF BALL MANUFACTURING METHOD

(75) Inventors: Hiroshi Higuchi, Chichibu (JP); Naoki Miyakoshi, Chichibu (JP); Akira Kimura, Chichibu (JP); Toru Ogawana, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 1398 days.

(21) Appl. No.: 11/144,006

(22) Filed: Jun. 3, 2005

(65) Prior Publication Data
US 2006/0273485 A1    Dec. 7, 2006

(51) Int. Cl.
*B29C 59/00*    (2006.01)
*B24B 5/20*    (2006.01)
(52) U.S. Cl. ..................... 264/162; 264/279.1
(58) Field of Classification Search ............ None
See application file for complete search history.

(56) References Cited

U.S. PATENT DOCUMENTS

| | | | | |
|---|---|---|---|---|
| 1,665,084 A | * | 4/1928 | Caster | 451/244 |
| 1,707,708 A | * | 4/1929 | Caster | 451/49 |
| 2,413,880 A | * | 1/1947 | Mason | 451/242 |
| 3,640,028 A | | 2/1972 | Richard | |
| 4,271,639 A | * | 6/1981 | Talalay et al. | 451/53 |

FOREIGN PATENT DOCUMENTS

| | | | |
|---|---|---|---|
| JP | 2000-14832 A | | 1/2000 |
| JP | 2000-288880 | * | 10/2000 |
| JP | 2001-309996 A | | 11/2001 |

OTHER PUBLICATIONS

Certified English translation of JP 2001-309996.*

* cited by examiner

*Primary Examiner*—Edmund H. Lee
(74) *Attorney, Agent, or Firm*—Sughrue Mion, PLLC

(57) ABSTRACT

The invention provides a method of manufacturing golf balls composed of a core and one or more cover layer which encloses the core, at least one cover layer being a thin layer having a thickness of 1.0 mm or less. The thin layer is formed to a desired thickness on a surface of a core or spherical body by holding within a mold cavity the core or a spherical body composed of the core enclosed by a cover layer and injecting a synthetic resin material into a space defined by a surface of the core or spherical body and an inner face of the mold cavity so as to form a cover layer on the surface of the core or spherical body, then grinding the resulting cover layer to a thickness of at least 0.1 mm with a specific type of grinder. Golf balls obtained in this way can be provided with a good sphericity even when the cover is formed to a very small thickness.

8 Claims, 2 Drawing Sheets

GOLF BALL MANUFACTURING METHOD

BACKGROUND OF THE INVENTION

Golf balls lately have not been limited only to one-piece golf balls and two-piece golf balls; a variety of balls having multilayer structures that include a multilayer cover or multiple covers have been proposed. Active efforts are being made to develop golf balls in which the formation of such a multilayer cover or multiple covers dramatically increases flight performance and also provides numerous advantages overall relating to, for instance, the feel of the ball when played, controllability on approach shots, and durability. In balls having multiple covers or a multi-layer cover, a smaller thickness per cover layer increases the degree of freedom in ball design, enabling golf balls of outstanding flight performance and other properties to be obtained. Such a golf ball having a thin cover is manufactured by supporting the core within a mold cavity and injection molding the cover into what remains of the cavity. However, the molten resin often does not flow well throughout the cavity, resulting in molding defects detrimental to the physical properties of the ball. It is particularly difficult to injection mold a very thin cover having a thickness of 1.0 mm or less, and so obtaining high-quality balls with satisfactory ball characteristics such as sphericity has been a challenge. To this end, various innovations, such as modifying the mold configuration by changing the size and increasing the number of mold parts, e.g., injection gates and vent pins, have been proposed. Unfortunately, this approach leads to higher mold fabrication costs and increases the labor associated with the manufacturing process.

U.S. Pat. No. 3,640,028 and JP-A 2000-14832 disclose grinding methods for removing molding flash from the surface of a golf ball or core and for reducing the ball or core diameter. However, these are not suitable as grinding methods for creating high-precision, ultrathin covers. That is, an excessive grinding force is unnecessary and inappropriate for deflashing. Diameter reduction does require a certain degree of grinding force, but such prior-art grinding methods are ill-suited for precisely finishing the entire spherical surface of the cover to a small thickness.

JP-A 2001-309996 describes the formation of a cover to a predetermined thickness by machining, but does not disclose a manufacturing method for obtaining balls of a high sphericity. Moreover, it is not possible to achieve a high sphericity simply by randomly grinding the surface of the cover layer. Because even a slight departure from a spherical shape may very well destabilize the flight performance and roll of a golf ball, and also decrease the rebound, worsen the feel on impact and reduce the durability, there exists a need to obtain balls of high sphericity.

SUMMARY OF THE INVENTION

It is therefore an object of the present invention to provide a golf ball manufacturing method which, even when the cover is formed to a very small thickness, imparts a good sphericity, thus making it possible to improve the rebound of the ball and enabling the ball to reliably achieve a lower spin on full shots so that it travels a longer distance.

After conducting extensive investigations in order to achieve this object, we learned that when a thin cover layer is formed by a conventional injection molding process, for example, because the resin does not spread well throughout the mold cavity, undesirable effects such as a low sphericity arise, making it difficult to obtain a thin layer of high quality. However, we have discovered that if, instead of forming a thin layer of the desired thickness by direct injection molding, a cover layer having a thickness of at least 1.0 mm is first injection-molded onto a core or the surface of a spherical body, then this cover layer is uniformly and evenly ground with a grinder to a thickness of at least 0.1 mm, a thin layer of the desired thickness can be formed.

Accordingly, the invention provides the following method of manufacturing golf balls.

(1) A method of manufacturing golf balls comprising a core and one or more cover layer which encloses the core, at least one cover layer being a thin layer having a thickness of 1.0 mm or less, which method is characterized by forming the thin layer on a surface of a core or spherical body by a process that includes steps (i) and (ii) below:
  (i) holding within a mold cavity the core or a spherical body composed of the core enclosed by a cover layer and injecting a synthetic resin material into a space defined by a surface of the core or spherical body and an inner face of the mold cavity so as to form a cover layer on the surface of the core or spherical body; and
  (ii) grinding the cover layer formed in step (i) to a thickness of 0.1 mm or more using a grinder comprising a cylindrical grinding tool which rotates on a shaft and has a periphery on which are formed a plurality of circumferential grooves, each corresponding in shape to the curved surface of a spherical workpiece to be ground, the grooves being arranged axially with respect to the rotary shaft, and comprising also a cylindrical restraining tool which is disposed parallel to the grinding tool and rotates on a shaft, the grinder being constructed so as to grind spherical workpieces placed between both tools by rotating the grinding tool and the restraining tool in the same direction, conferring a specific peripheral speed ratio therebetween, and at the same time causing the restraining tool to oscillate axially with respect to the shaft thereof.

(2) The golf ball manufacturing method of (1) above, wherein the grinding tool rotates at a speed of 1500 to 3500 rpm, the restraining tool rotates at a speed of 10 to 500 rpm, and the peripheral speed ratio is from 6 to 800.

(3) The golf ball manufacturing method of (1) above, wherein the restraining tool is made to oscillate at an amplitude of 0 to 20 mm and a speed of 6 to 200 cycles per minute.

(4) The golf ball manufacturing method of (1) above, wherein the cover layer is formed directly on the surface of the core, after which the surface of the cover layer is finished to a thin layer having a thickness of 0.1 to 1.0 mm by grinding with the grinder.

(5) The golf ball manufacturing method of (4) above, wherein the synthetic resin material making up the thin layer is a thermoplastic resin.

(6) The golf ball manufacturing method of (1) above which is a method of manufacturing a golf ball composed of a core enclosed by two or more cover layers, wherein a cover layer is formed to a thickness of at least 1.0 mm, then is ground to a thin layer having a thickness of at least 0.1 but less than 1.0 mm.

(7) The golf ball manufacturing method of (1) above, wherein a cover layer is formed on the core or spherical body to a thickness of 0.9 mm or more and subsequently ground with the grinder to a thickness of at least 0.1 mm so as to form a thin layer having a thickness of at least 0.1 mm but less than 0.9 mm, following which dimples are impressed onto the thin layer.

(8) The golf ball manufacturing method of (1) above, wherein the cylindrical grinding tool which rotates on a shaft and has a periphery on which are formed a plurality of circumferential grooves corresponding in shape to the curved surfaces of spherical workpieces to be ground and arranged axially with respect to the rotary shaft is divided up at intervals of any number of grooves and the number and arrangement of grooves are suitably adjusted.

(9) The golf ball manufacturing method of (1) above, wherein the grinding tool is an electrodeposited diamond wheel.

(10) The golf ball manufacturing method of (9) above, wherein the electrodeposited diamond wheel has a diamond grit size selected from a range of 36 to 2000.

BRIEF DESCRIPTION OF THE DIAGRAM

DETAILED DESCRIPTION OF THE INVENTION

Figure 1:
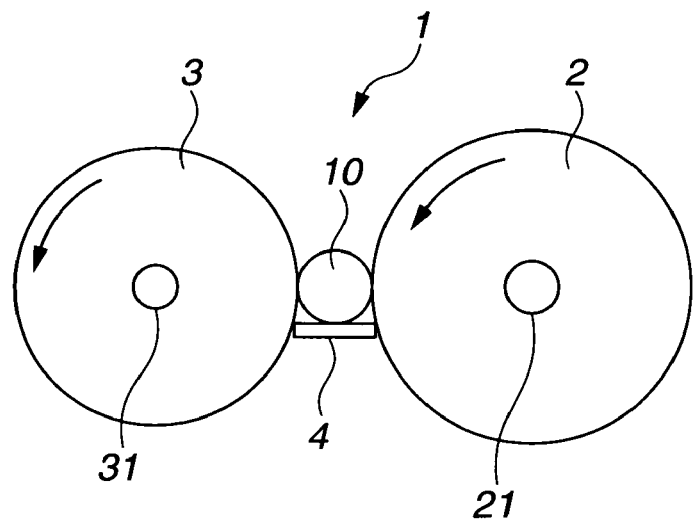
FIG. 1 is a schematic front view of an example of the grinder used in the manufacturing method of the invention.

The inventive method of manufacturing golf balls is described more fully below.

The purpose of the inventive manufacturing method is to obtain golf balls having a core and one or more cover layer enclosing the core; that is, golf balls which are two-piece solid golf balls or multi-piece solid golf balls such as three-piece solid golf balls and four-piece solid golf balls in which at least one cover layer is a thin layer having a thickness of 1.0 mm or less.

In the invention, the method of forming the thin layer is a method for obtaining a thin layer of the desired thickness which involves holding a core or a spherical body composed of a core enclosed by a cover layer within a mold cavity and injecting a synthetic resin material into a space defined by a surface of the core or spherical body and an inner face of the mold cavity so as to form a cover layer having a thickness of at least 1.0 mm on the surface of the core or spherical body, then grinding this cover layer to a thickness of at least 0.1 mm or more using a grinder.

Here, a commonly used injection molding mold may be employed as the mold in the invention. The core may be a spherical rubber molding obtained by subjecting a known core material such as a rubber composition composed primarily of polybutadiene to a commonly used vulcanizing method.

The cover layer material is not subject to any particular limitation, although it is preferable to use a known synthetic resin material, and especially a thermoplastic resin. The use of a thermoplastic resin as the primary component is preferred. Exemplary thermoplastic resins include ionomer resins, polyester elastomers, polyamide elastomers, urethane resins, and mixtures thereof. Illustrative examples of such resins that may be used include polyester thermoplastic elastomers of the Hytrel series (produced by DuPont-Toray Co., Ltd.), ionomer resins of the Himilan series (DuPont-Mitsui Polychemicals Co., Ltd.) and Surlyn series (E.I. du Pont de Nemours & Co.), and aliphatic or aromatic diisocyanates of the Pandex series (DIC Bayer Polymer, Ltd.). Any one or mixtures of two or more of these may be used. The thermoplastic polyurethane elastomer may be a commercial product. Illustrative examples include those made with an aliphatic or aromatic diisocyanate, such as Pandex T7298, Pandex T7295, Pandex T7890, Pandex TR3080, Pandex T8290, Pandex T8295 and Pandex T1188 (all manufactured by DIC Bayer Polymer, Ltd.). Illustrative examples of commercial ionomer resins include Surlyn 6320, Surlyn 8945, Surlyn 9945 and Surlyn 8120 (E.I. du Pont de Nemours & Co.), and Himilan 1706, Himilan 1605, Himilan 1855, Himilan 1557, Himilan 1601 and Himilan AM7316 (DuPont-Mitsui Polychemicals Co., Ltd.). The above thermoplastic resin may have additives compounded therewith, including an inorganic filler such as zinc oxide or barium sulfate as a weight modifier, and titanium dioxide as a colorant. Polymers, including various other thermoplastic elastomers, may be blended as optional ingredients with the above thermoplastic resin serving as the primary component of the cover layer. Specific examples of polymers that may be used as optional ingredients include polyamide elastomers, styrene block elastomers, hydrogenated polybutadienes and ethylene-vinyl acetate (EVA) copolymers.

The one or more cover layer can be obtained by employing a commonly used process such as injection molding to form a cover layer on the surface of the core or spherical body.

In the inventive method of manufacture, the thin layer is one of the cover layers, and refers to a layer having a thickness of 1.0 mm or less. For example, in a three-piece golf ball, at least one of the two cover layers other than the core should be a thin layer. In a four-piece solid golf ball, at least one of the three cover layers other than the core—that is, the envelope layer, intermediate layer and outermost layer—should be a thin layer having a thickness of 1.0 mm or less. Like the other cover layers, this thin layer can be made of a known synthetic resin material; the use of a thermoplastic resin such as an ionomer resin or an ionomer resin having a relatively high degree of neutralization is especially preferred. The thin layer and the other cover layers may be made of the same resin material or different resin materials.

Steps (i) and (ii) described below are essential to form the thin film.

(i) As in a commonly used injection molding process, a core or spherical body is held within a mold cavity, and a synthetic resin material is injected into a space defined by the surface of the core or the spherical body and an inner face of the mold cavity so as to form a cover layer. The cover layer obtained by injection molding has a thickness of generally at least 0.9 mm, preferably at least 1.0 mm, more preferably at least 1.1 mm, and most preferably at least 1.2 mm, but preferably not more than 2.0 mm, more preferably not more than 1.8 mm, and even more preferably not more than 1.6 mm.

Figure 3:
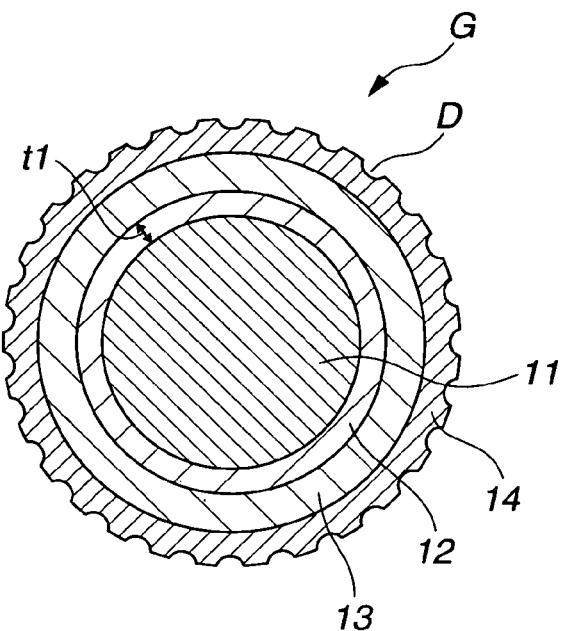
FIG. 3 is a schematic sectional view of an example of a golf ball obtained by the manufacturing method of the invention.
Figure 4:
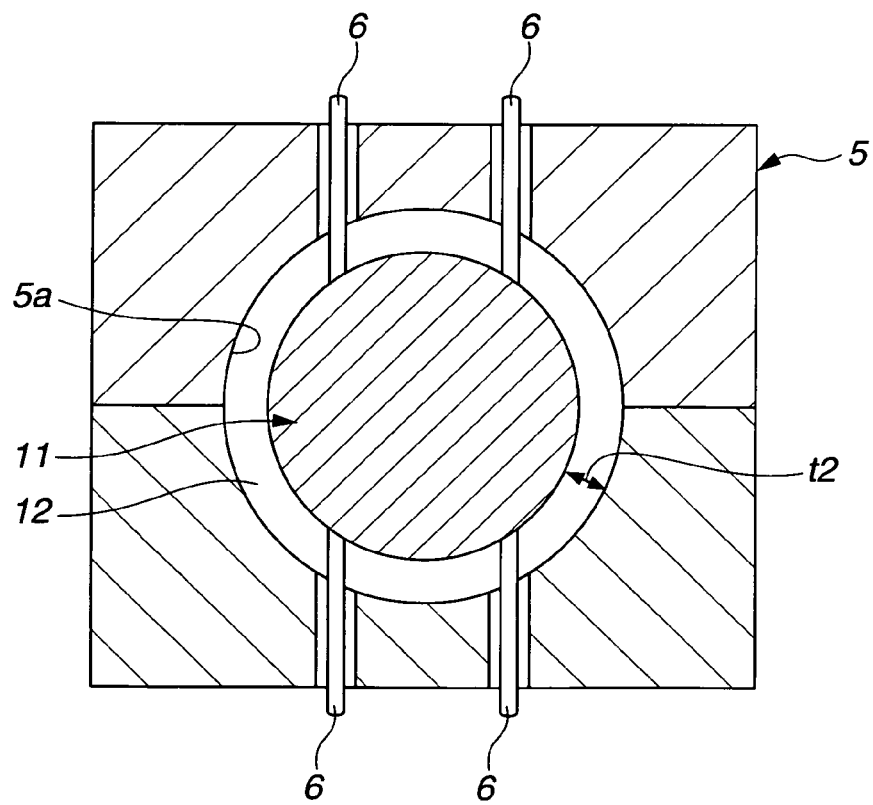
FIG. 4 is a schematic sectional view of a mold that may be used to injection mold a first cover layer (envelope layer) onto the core surface during production of the golf ball in FIG. 3.

An example of this step (i) is now described in which a first cover layer (envelope layer) is formed as the thin film in, referring to FIG. 3, a four-piece golf ball (4-layer construction) consisting of a core 11, and a first cover layer (envelope layer) 12, a second cover layer (intermediate layer) 13 and a third cover layer (outermost layer) 14 having a plurality of dimples D on an outer surface thereof, which successively enclose the cover. Referring to FIG. 4, the core 11 is held within the cavity of a mold 5 by a plurality of support pins 6, and a synthetic resin material is injection molded into a space 12a defined by the surface of the core and the inner face 5a of the mold cavity, thereby forming a first cover layer (envelope layer) having a thickness t2.

(ii) Next, the cover layer is ground to a thickness of 0.1 mm or more using a grinder, thereby forming a thin film of the desired thickness. In the four-piece golf ball (4-layer construction) shown in FIG. 3, the outer surface of the first cover layer (envelope layer) having a thickness t2 is mechanically ground by the grinder in an even and uniform manner, this grinding operation being carried out to a desired thickness t1. The thickness to which the cover layer is ground using the grinder is generally at least 0.1 mm, preferably at least 0.2 mm, and more preferably at least 0.3 mm, but generally not more than 1.0 mm, preferably not more than 0.8 mm, more preferably not more than 0.7 mm, even more preferably not more than 0.6 mm, and most preferably not more than 0.5 mm.

Figure 2:
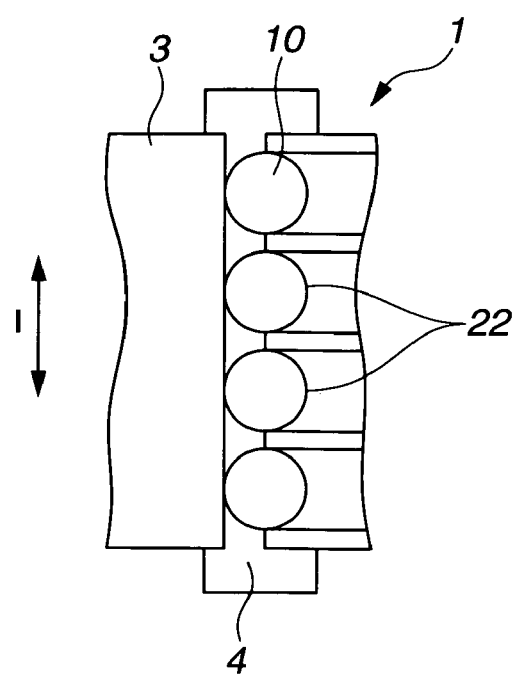
FIG. 2 is a schematic plan view showing a portion of the same grinder.

Various known grinders may be employed as the grinder used to grind the thin layer, although an apparatus capable of uniformly and evenly grinding the spherical surface of the workpiece to be ground is preferred. The use of the grinder shown in FIGS. 1 and 2 as such a grinder is most preferred. This grinder 1 is equipped with a cylindrical grinding tool 2 which rotates on a shaft 21 and has a periphery on which are formed a plurality of circumferential grooves 22, each corresponding in shape to the curved surface of a spherical workpiece to be ground, the grooves being arranged axially with respect to the rotary shaft 21. The grinder 1 is also equipped with a cylindrical restraining tool 3 which is disposed parallel to the grinding tool 2 and rotates on a shaft 31. In FIG. 1, reference symbol 4 denotes a receptacle for receiving and supporting the spherical workpieces 10 disposed between the grinding tool 2 and the restraining tool 3. In the method of grinding sphere surfaces using this grinder 1, the spherical workpieces 10 are placed between the cylindrical grinding tool 2 and the cylindrical restraining tool 3 and the surfaces of the spherical workpieces 10 are ground by rotating the grinding tool 2 and the restraining tool 3 in the same direction, as indicated by the arrows in the diagram, conferring a peripheral speed ratio between the rotational speeds of both tools 2 and 3, and at the same time causing the restraining tool 3 to oscillate axially with respect to the shaft 31 thereof.

The grinding tool 2 is mounted so as to be rotatable in the direction of the arrow in the diagram under the action of a driving source (not shown). It is desirable for the grinding tool 2 to be controlled to a speed of rotation of at least 1500 rpm, and preferably at least 2000 rpm, but not more than 3500 rpm, and preferably not more than 3000 rpm. The restraining tool 3 also is mounted so as to be rotatable in the direction of the arrow in the diagram under the action of a driving source (not shown). It is desirable for the restraining tool 3 to be controlled to a speed of rotation of at least 10 rpm, and preferably at least 100 rpm, but not more than 500 rpm, and preferably not more than 300 rpm. The peripheral speed ratio (slip ratio) between the grinding tool 2 and the restraining tool 3 is set to at least 6, preferably at least 15, and more preferably at least 20, but not more than 800, preferably not more than 69, and even more preferably not more than 50.

The restraining tool 3 is constructed so as to be capable of oscillating in the direction shown by arrow I in the diagram. The amplitude of oscillation by the restraining tool 3 is set to at least 0 mm, and preferably at least 2 mm, but not more than 20 mm, and preferably not more than 10 mm. It is advantageous for the speed of oscillation to be set to at least 6 cycles/min, and preferably at least 30 cycles/min, but not more than 200 cycles/min, and preferably not more than 120 cycles/min.

Thus, in this grinder 1, the grinding tool 2 and the restraining tool 3 both rotate in the same direction, but because the rotating grinding tool 2 has been conferred with a specific slip ratio, it rotates at a higher speed than the restraining tool 3. At the same time, the restraining tool 3 is capable of oscillating parallel to the shaft 31 thereof (direction of arrow I in FIG. 2).

This arrangement enables the grinder 1 to uniformly and evenly grind the surface of the spherical bodies 10 serving as the grinding workpieces.

A plurality of circumferential grooves 22, each corresponding in shape to the curved surface of the spherical bodies, are formed in the grinding tool 2. Although not illustrated in the diagrams, by optionally separating this plurality of grooves 22 at each groove and suitably adjusting the number thereof, the grooves can be brought into the closest possible alignment, increasing the grinding precision for individual spherical bodies 10. Moreover, changing the arrangement of the individual grinding tools separated groove for groove enables the efficient production of highly uniform balls. In addition, the surface roughness can be varied as desired according to the type of ball.

With regard to the material of which the grinding tool 2 is made, any existing aluminum oxide or silicon carbide grinding wheel in common use may be employed. However, for good stability in the quality of the grinding tool 2, the use of an electrodeposited diamond wheel is preferred. Based on the type of material to be ground and on the target sphericity and surface roughness, it is preferable for the electrodeposited diamond wheel to have a diamond grit size of at least 36, and preferably at least 46, but not more than 2000, preferably not more than 1000, more preferably not more than 500, and most preferably not more than 150.

Examples of golf balls having a thin layer obtained by such a grinding method include golf balls manufactured by forming a cover layer directly on the surface of the core, then grinding the surface of the cover layer with the above-described grinder so as to finish it to a thin layer having a thickness of 0.1 to 1.0 mm; golf balls having a core enclosed by two or more cover layers, including a thin layer formed to a thickness of 0.1 mm or more but less than 1.0 mm and another cover layer formed to a thickness of 1.0 mm or more; and golf balls manufactured by forming a cover layer to a thickness of at least 0.9 mm on the surface of a core or spherical body, then grinding the cover layer to a thickness of 0.1 mm or more using the above-described grinder so as to form a thin layer having a thickness of at least 0.1 mm but less than 0.9 mm, and subsequently impressing dimples onto the thin layer. Dimples are formed in this way for the following reason. To have the outermost layer of the cover layer be thin, the surface must be ground and finished to a small thickness. Hence, dimples are impressed onto the outermost layer after it has been finished to the desired thinness by grinding. This dimple forming method involves the use of a mold having raised dimple-forming features that are transferred to the ball surface. A golf ball having a dimple-free cover layer that has been ground to a thin layer is held in any suitable fashion within the mold at a temperature equal to or above the melting point of the resin. The cover layer melts, allowing the dimples to be transferred to the cover surface. After a given length of time, the mold cavity is cooled, and the golf ball with the thin layer that now bears dimples is removed from the mold.

The inventive manufacturing method enables golf balls to be reused and re-manufactured. For example, in an existing golf ball having a cover layer with a thickness of 1.0 mm or more, the cover layer can be ground to a thickness of 0 mm with the above-described grinder; that is, the spherical center of the ball, such as the core, can be reliably and smoothly extracted and reused, enabling the need for the recycling of resources to be met even in the area of golf ball production. From the standpoint of re-manufacturability, it is preferable for such spherical centers that are reused to be a solid core or a spherical body composed of a core enclosed by an inner cover of any thickness.

As described above, the golf ball manufacturing method of the invention is able to uniformly and evenly form a thin cover layer on a core or spherical body, thus enabling golf balls of good sphericity to be obtained. In golf balls obtained by the inventive method of manufacture, the high sphericity that is imparted, in combination with the functionality provided by the thin layer, serves to improve the rebound and reduce the spin rate of the ball on full shots, enabling a dramatic increase in carry.

EXAMPLES

The following examples of the invention and comparative examples are provided by way of illustration and not by way of limitation.

Examples 1 to 3, Comparative Examples 1 to 4

In each example, the core composition shown below was prepared, then molded and vulcanized at 160° C. for 17 minutes to give a solid core of a specific diameter and deflection. A first cover layer (envelope layer), a second cover layer (intermediate layer) and a third cover layer (outermost layer) were each injection molded onto this core from one of formulations A, B and C in Table 1, successively forming the first to third cover layers over the solid core.

The first to third cover layers were each molded with an injection molding machine to the specific cover layer thicknesses indicated in Tables 2 and 3. After molding, one of the cover layers was mechanically ground with a grinder that satisfied the following conditions, and thereby finished to a thin layer of the thickness indicated in Tables 2 and 3.

| Core Composition | |
|---|---|
| cis-1,4-Polybutadiene rubber (BR730, produced by JSR Corporation) | 100 parts by weight |
| 1,1-Di(t-butylperoxy)cyclohexane (Perhexa C-40, produced by NOF Corporation) | 0.3 part by weight |
| Dicumyl peroxide (Percumil D, Produced by NOF Corporation) | 0.3 part by weight |
| Zinc oxide | 20.4 parts by weight |
| Antioxidant (Nocrac NS-6, produced by Ouchi Shinko Chemical Industry Co., Ltd.) | 0.1 part by weight |
| Zinc acrylate (Nihon Jyoryu Kogyo Co., Ltd.) | 29.5 parts by weight |
| Zinc stearate | 5 parts by weight |
| Zinc salt of pentachlorothiophenol | 0.3 part by weight |

Mechanical Grinder Conditions

The grinding tool was an electrodeposited diamond wheel with a diamond grit size of 60. In Example 1, the grooves had a cross-sectional shape that was semicircular with a radius of curvature R of 19 to 40 mm. The grinding tool was set to a speed of 2500 rpm and the restraining tool was set to a speed of 160 rpm, giving a slip ratio of 31. Oscillation by the restraining tool was set to an amplitude of 5 mm and a speed of 60 cycles/min. To obtain a workpiece of a required diameter, a given amount of cutting takes a given length of time. In this case, it took 6 seconds to achieve the required diameter. The cutting speed was set at 6 mm/s. The grinding tool had five grooves, and the grinding conditions employed yielded five workpieces in 10-second cycles. Using a grinder which met these conditions, both an acceptable quality and an acceptable productivity were achieved.

TABLE 1

| | (parts by weight) | | |
|---|---|---|---|
| | A | B | C |
| Himilan 1605 | | 68.75 | |
| Himilan 1555 | 35 | | |
| Himilan 1557 | 35 | | |
| Primalloy N2800 | 25 | | |
| Dynaron 6100P | | 31.25 | |
| Dynaron 4630 | 5 | | |
| Pandex T8295 | | | 75 |
| Pandex T8290 | | | 25 |
| Behenic acid | | 18 | |
| Calcium hydroxide | | 2.3 | |
| Polytail H | | 2 | |
| Titanium dioxide | | | 4 |
| Barium sulfate | 20 | | |
| Magnesium stearate | 1 | | |
| Polyethylene wax | | | 1.5 |
| Crossnate EM30 | | | 15 |

Trade names for most of the materials appearing in the table are as follows.

Himilan: Ionomer resins produced by DuPont-Mitsui Polychemicals Co., Ltd.

Primalloy: A polyester elastomer produced by Mitsubishi Chemical Corporation

Dynaron: Hydrogenated butadiene-styrene block copolymers produced by JSR Corporation.

Pandex: Thermoplastic polyurethane elastomers produced by Dainippon Ink & Chemicals, Inc.

Polytail H: A low-molecular-weight polyolefin-type polyol produced by Mitsubishi Chemical Corporation Crossnate EM30: An isocyanate compound master batch which is produced by Dainichi Seika Colour & Chemicals Mfg. Co., Ltd. and has a 4,4'-diphenylmethane diisocyanate content of 30%.

The golf balls obtained in above Examples 1 to 3 and Comparative Examples 1 to 4 were each evaluated for sphericity and flight performance. The results are shown in Tables 2 and 3.

Core Deflection

The deflection (mm) of the overall core when subjected to a final load of 130 kg from an initial load of 10 kg was measured.

Sphericity

The sphericity was obtained by measuring the diameter of a single ball at 15 random points on the ball, and determining the difference between the largest value and the smallest value (largest value−smallest value) in millimeters.

Rebound

The initial velocity was measured using an initial velocity instrument of the same type as that used by the official regulating body—the United States Golf Association (USGA).

Distance

The total distance traveled by the ball when hit at a head speed (HS) of 50 m/s with a driver (Tour Stage X-DRIVE TYPE 300 PROSPEC, manufactured by Bridgestone Sports Co., Ltd.; loft angle, 8°) mounted on a swing robot (Miyamae Co., Ltd.) was measured. The spin rate and initial velocity were measured using high-speed camera images of the ball taken immediately after impact. Each average value and standard deviation shown in Tables 2 and 3 was obtained from ten balls shot in this way.

TABLE 2

|  |  | Example 1 | Comparative Example 1 | Comparative Example 2 | Example 2 | Comparative Example 3 |
|---|---|---|---|---|---|---|
| Core | Diameter (mm) | 36.30 | 36.30 | 35.90 | 36.90 | 37.00 |
|  | Deflection (mm) | 3.0 | 3.0 | 2.9 | 3.1 | 3.1 |
| First cover layer (envelope layer) (resin A) | Diameter after injection molding (mm) | 38.60 | 38.20 | 38.20 | 39.20 | 38.30 |
|  | Thickness (mm) | 1.15 | 0.95 | 1.15 | 1.15 | 0.65 |
|  | Sphericity | 0.15 | 0.40 | 0.15 | 0.15 | — |
|  | Thickness removed by grinding (mm) | 0.40 | — | — | 1.00 | — |
|  | Diameter after grinding (mm) | 38.20 | — | — | 38.20 | — |
|  | Thickness (mm) | 0.95 | — | — | 0.65 | — |
|  | Sphericity | 0.08 | — | — | 0.07 | — |
| Second cover layer (intermediate layer) (resin B) | Diameter (mm) | 40.60 | 40.60 | 40.60 | 40.60 | — |
|  | Thickness (mm) | 1.20 | 1.20 | 1.20 | 1.20 | — |
|  | Sphericity | 0.13 | 0.13 | 0.13 | 0.13 | — |
| Third cover layer (outermost layer) (resin C) | Diameter (mm) | 42.70 | 42.70 | 42.70 | 42.70 | — |
|  | Thickness (mm) | 1.05 | 1.05 | 1.05 | 1.05 | — |
|  | Sphericity | 0.10 | 0.10 | 0.10 | 0.10 | — |
| Rebound (m/s) |  | 77.2 | 77.2 | 76.9 | 77.5 |  |
| Flight (HS, 50 m/s) | Average Spin (rpm) | 2530 | 2540 | 2650 | 2410 |  |
|  | Carry (m) | 241.5 | 241.5 | 239.5 | 243.0 |  |
|  | Total (m) | 262.5 | 262.0 | 260.0 | 265.0 |  |
|  | Standard deviation Spin (rpm) | 130 | 190 | 140 | 120 |  |
|  | Carry (m) | 4.3 | 7.7 | 4.5 | 4.0 |  |
|  | Total (m) | 5.6 | 9.4 | 6.0 | 5.4 |  |

From the results in Table 2, it is apparent that because of the small thickness of the envelope layer in the ball design in Comparative Example 1, injection molding was defective and a good sphericity could not be achieved. Moreover, the flight of the ball was highly variable. In the ball design in Comparative Example 2, the envelope layer was thick, reducing the rebound and shortening the distance of the ball. In the ball design in Comparative Example 3, the thickness during injection molding was so low that the resin material did not spread properly within the mold, making injection molding impossible to complete.

TABLE 3

|  |  | Example 3 | Comparative Example 4 | Comparative Example 2 |
|---|---|---|---|---|
| Core | Diameter (mm) | 36.90 | 36.90 | 35.90 |
|  | Deflection (mm) | 3.1 | 3.1 | 2.9 |
| First cover layer (envelope layer) | Diameter (mm) | 39.20 | 39.20 | 38.20 |
|  | Thickness (mm) | 1.15 | 1.15 | 1.15 |
|  | Sphericity | 0.14 | 0.14 | 0.15 |
| Second cover layer (intermediate layer) | Diameter (mm) | 41.60 | 41.60 | 40.60 |
|  | Thickness (mm) | 1.20 | 1.20 | 1.20 |
|  | Sphericity | 0.13 | 0.13 | 0.13 |
| Third cover layer (outermost layer) | Diameter after injection molding (mm) | 43.70 | 42.70 | 42.70 |
|  | Thickness (mm) | 1.05 | 0.55 | 1.05 |
|  | Sphericity | 0.11 | 0.53 | 0.10 |
|  | Thickness removed by grinding (mm) | 1.00 | — | — |
|  | Diameter after grinding and dimple formation (mm) | 42.70 | — | — |
|  | Thickness (mm) | 0.55 | — | — |
|  | Sphericity | 0.09 | — | — |
| Rebound (m/s) |  | 77.5 | 77.5 | 76.9 |
| Flight (HS, 50 m/s) | Average Spin (rpm) | 2360 | 2370 | 2650 |
|  | Carry (m) | 243.5 | 243.5 | 239.5 |
|  | Total (m) | 265.5 | 265.0 | 260.0 |
|  | Standard deviation Spin (rpm) | 120 | 200 | 140 |
|  | Carry (m) | 4.1 | 7.5 | 4.5 |
|  | Total (m) | 5.2 | 9.3 | 6.0 |

Note:
In Example 3, the outermost layer was ground, following which dimples were impressed onto the outer surface of the outermost layer.

From the results in Table 3, it is apparent that the small thickness of the outermost layer in the ball design in Comparative Example 4 resulted in poor injection molding, preventing good sphericity from being achieved. In the ball design in Comparative Example 2, the envelope layer was thick, reducing the rebound and shortening the distance of the ball. The flight of the ball in this comparative example also had a large variability.

The invention claimed is:

1. A method of manufacturing golf balls comprising a core and one or more cover layer which encloses the core, at least one cover layer being a thin layer made of a synthetic resin material having a thickness of 1.0 mm or less, which method is characterized by forming the thin layer on a surface of a core or spherical body by a process that includes steps (i) and (ii) below:
   (i) holding within a mold cavity the core or a spherical body composed of the core enclosed by a cover layer and injecting a synthetic resin material into a space defined by a surface of the core or spherical body and an inner face of the mold cavity so as to form a cover layer on the surface of the core or spherical body; and (ii) grinding the cover layer formed in step (i) to a thickness of 0.1 mm or more using a grinder comprising a cylindrical grinding tool which rotates on a shaft and has a periphery on which are formed a plurality of circumferential grooves, each corresponding in shape to the curved surface of a spherical workpiece to be ground, the grooves being arranged axially with respect to the rotary shaft, and comprising also a cylindrical restraining tool which is disposed parallel to the grinding tool and rotates on a shaft, the grinder being constructed so as to grind spherical workpieces placed between both tools by rotating the grinding tool and the restraining tool in the same direction, conferring a peripheral speed ratio therebetween, and at the same time causing the restraining tool to oscillate axially with respect to the shaft thereof, wherein the grinding tool rotates at a speed of 2000 to 3000 rpm, the restraining tool rotates at a speed of 100 to 300 rpm, and the peripheral speed ratio is from 20 to 69, and wherein the restraining tool is made to oscillate at an amplitude of 2 to 10 mm and a speed of 30 to 120 cycled per minute.

2. The golf ball manufacturing method of claim 1, wherein the cover layer is formed directly on the surface of the core, after which the surface of the cover layer is finished to a thin layer having a thickness of 0.1 to 1.0 mm by grinding with the grinder.

3. The golf ball manufacturing method of claim 1, wherein the synthetic resin material making up the thin layer is a thermoplastic resin.

4. The golf ball manufacturing method of claim 1 which is a method of manufacturing a golf ball composed of a core enclosed by two or more cover layers, wherein a cover layer is formed to a thickness of at least 1.0 mm, then is ground to a thin layer having a thickness of 0.1 to 1.0 mm.

5. The golf ball manufacturing method of claim 1, wherein a cover layer is formed on the core or spherical body to a thickness of 0.9 mm or more and subsequently ground with the grinder to a thickness of at least 0.1 mm so as to form a thin layer having a thickness of at least 0.1 mm but less than 0.9 mm, following which dimples are impressed onto the thin layer.

6. The golf ball manufacturing method of claim 1, wherein the cylindrical grinding tool which rotates on a shaft and has a periphery on which are formed a plurality of circumferential grooves corresponding in shape to the curved surfaces of spherical workpieces to be ground and arranged axially with respect to the rotary shaft is divided up at intervals of any number of grooves and the number and arrangement of grooves are suitably adjusted.

7. The golf ball manufacturing method of claim 1, wherein the grinding includes using a grinder comprising an electrodeposited diamond wheel having a diamond grit size selected from a range of 36 to 2000.

8. The golf ball manufacturing method of claim 1, wherein the synthetic resin material making up the thin layer is a thermoplastic resin selected from the group consisting of ionomer resins, polyester elastomers, polyamide elastomers, urethane resins, and mixtures thereof.

* * * * *